United States Patent
Natori (10) Patent No.: US 10,011,745 B2
(45) Date of Patent: Jul. 3, 2018

(54) THERMOSETTING ADHESIVE COMPOSITION AND THERMOSETTING ADHESIVE SHEET

(71) Applicant: DEXERIALS CORPORATION, Tokyo (JP)

(72) Inventor: Toshiki Natori, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 15/523,828

(22) PCT Filed: Nov. 11, 2015

(86) PCT No.: PCT/JP2015/081737
§ 371 (c)(1),
(2) Date: May 2, 2017

(87) PCT Pub. No.: WO2016/076356
PCT Pub. Date: May 19, 2016

(65) Prior Publication Data
US 2017/0313914 A1     Nov. 2, 2017

(30) Foreign Application Priority Data

Nov. 12, 2014   (JP) ................ 2014-230058

(51) Int. Cl.
| | | |
|---|---|---|
| *C08K 3/10* | (2018.01) | |
| *C09J 133/08* | (2006.01) | |
| *C09J 7/00* | (2018.01) | |
| *C09J 9/02* | (2006.01) | |
| *C09J 11/04* | (2006.01) | |

(52) U.S. Cl.
CPC .......... *C09J 133/08* (2013.01); *C09J 7/00* (2013.01); *C09J 9/02* (2013.01); *C09J 11/04* (2013.01)

(58) Field of Classification Search
CPC ... C09J 133/08; C09J 11/04; C09J 7/00; C09J 9/02
USPC .......................................................... 524/413
See application file for complete search history.

(56) References Cited

U.S. PATENT DOCUMENTS

| | | | | |
|---|---|---|---|---|
| 2009/0314533 A1* | 12/2009 | Watanabe | ............ | C09J 9/02 |
| | | | | 174/259 |
| 2013/0183520 A1* | 7/2013 | Natori | ............ | C08G 59/4035 |
| | | | | 428/349 |

FOREIGN PATENT DOCUMENTS

| | | | |
|---|---|---|---|
| CN | 103597551 B * | 4/2016 | ......... H05K 9/0083 |
| JP | 2006-022230 A | 1/2006 | |
| JP | 2008-308682 A | 12/2008 | |
| JP | 2011-079959 A | 4/2011 | |
| WO | 2000/009623 A1 | 2/2000 | |
| WO | 2012/073703 A1 | 6/2012 | |
| WO | 2012/164925 A1 | 12/2012 | |
| WO | 2013/183486 A1 | 12/2013 | |

OTHER PUBLICATIONS

Translation of CN103597551, Apr. 6, 2016.*
Jan. 12, 2016 International Search Report issued in International Patent Application No. PCT/JP2015/081737.

* cited by examiner

*Primary Examiner* — Hui Chin
(74) *Attorney, Agent, or Firm* — Oliff PLC (57) ABSTRACT

A thermosetting adhesive composition and thermosetting adhesive sheet capable of obtaining stable conductivity even in high-temperature environments or high-temperature/high-humidity environments are provided. The thermosetting adhesive sheet comprises an acrylic copolymer obtained by copolymerizing 55 to 80 wt % of alkyl (meth)acrylate, 15 to 30 wt % of acrylonitrile, and 5 to 15 wt % of glycidyl methacrylate; an epoxy resin; an epoxy resin curing agent; and a dendritic conductive filler having a tap density of 1.0 to 1.8 g/cm³. Thereby, thermal expansion after curing is suppressed, and electrical contacts of the conductive filler are increased, allowing stable conductivity to be obtained even in high-temperature environments or high-temperature/high-humidity environments.

15 Claims, 2 Drawing Sheets

THERMOSETTING ADHESIVE COMPOSITION AND THERMOSETTING ADHESIVE SHEET

TECHNICAL FIELD

The present disclosure relates to a conductive thermosetting adhesive composition and a thermosetting adhesive sheet for connecting a ground terminal of a flexible printed wiring board to a metal plate and reinforcing the flexible printed wiring board with the metal plate. This application claims priority to Japanese Patent Application No. 2014-230058 filed on Nov. 12, 2014, the entire content of which is hereby incorporated by reference.

BACKGROUND ART

Conventionally, flexible printed wiring boards are adhered to metal plates so that, in addition to providing reinforcement, ground terminals of the flexible printed wire boards are grounded to the metal plates and shielded. A conductive thermosetting adhesive composition has been used to bond flexible printed wiring boards to metal plates (for example, see PLT. 1).

However, in conventional thermosetting adhesive compositions, conductivity is lowered and grounding is sometimes insufficient in high-temperature environments or high-temperature/high-humidity environments.

CITATION LIST

Patent Literature

PLT: 1 Japanese Unexamined Patent Application Publication No. 2011-79959

SUMMARY OF THE INVENTION

Technical Problem

The present invention has been proposed in view of such conventional circumstances, and it is an object of the present invention to provide a thermosetting adhesive composition and thermosetting adhesive sheet capable of obtaining stable conductivity even in high-temperature environments or high-temperature/high-humidity environments.

Solution to Problem

As a result of intensive studies, the present inventors have found that by using an acrylic copolymer with a predetermined blend and a dendritic conductive filler having a predetermined tap density, even in high-temperature environments or high-temperature/high-humidity environments, stable conductivity can be obtained.

Thus, a thermosetting adhesive composition according to the present disclosure comprises an acrylic copolymer obtained by copolymerizing 55 to 80 wt % of alkyl (meth) acrylate, 15 to 30 wt % of acrylonitrile, and 5 to 15 wt % of glycidyl methacrylate; an epoxy resin; an epoxy resin curing agent; and a dendritic conductive filler having a tap density of 1.0 to 1.8 g/cm³.

Furthermore, a thermosetting adhesive sheet according to the present disclosure comprises an acrylic copolymer obtained by copolymerizing 55 to 80 wt % of alkyl (meth) acrylate, 15 to 30 wt % of acrylonitrile, and 5 to 15 wt % of glycidyl methacrylate; an epoxy resin; an epoxy resin curing agent; and a dendritic conductive filler having a tap density of 1.0 to 1.8 g/cm³.

Advantageous Effects of Invention

According to the present invention, because thermal expansion after curing is suppressed by the acrylic copolymer with a predetermined blend and electrical contacts of the conductive filler are increased by the dendritic conductive filler which has a predetermined tap density, stable conductivity can be obtained even in high-temperature environments or high-temperature/high-humidity environments.

DESCRIPTION OF EMBODIMENTS

Embodiments of the present invention will now be more particularly described according to the following order with reference to the accompanying drawings.
1. Thermosetting Adhesive Composition
2. Thermosetting Adhesive Sheet
3. Examples

1. Thermosetting Adhesive Composition

A thermosetting adhesive composition according to the present embodiment comprises an acrylic copolymer (A) obtained by copolymerizing 55 to 80 wt % of alkyl (meth) acrylate, 15 to 30 wt % of acrylonitrile (AN), and 5 to 15 wt % of glycidyl methacrylate (GMA); an epoxy resin (B); an epoxy resin curing agent (C); and a dendritic conductive filler (D) having a tap density of 1.0 to 1.8 g/cm³. Hereinafter, each component (A) to (D) of the thermosetting adhesive composition will be described in detail.

(A) Acrylic Copolymer

The acrylic copolymer imparts film-forming properties at the time of film forming as well as flexibility/resilience to the cured product and is obtained by copolymerizing alkyl (meth)acrylate, acrylonitrile (AN), and glycidyl methacrylate (GMA). Herein, (meth)acrylate means acrylate (acrylic acid ester) or methacrylate (methacrylic acid ester).

The alkyl (meth)acrylate can be selected as appropriate from those used in conventional acrylic thermosetting adhesives in the field of electronic components, and, for example, alkyl (meth)acrylates having an alkyl group with 4 to 20 carbon atoms, among others, can be used. In particular, examples include methyl (meth)acrylate, ethyl (meth)acrylate, propyl (meth)acrylate, butyl (meth)acrylate, isobutyl (meth)acrylate, 2-ethylhexyl (meth)acrylate, octyl (meth) acrylate, isooctyl (meth)acrylate, isononyl (meth)acrylate, and lauryl (meth)acrylate, among others; these may be used individually or in a combination of two or more. Among these, ethyl acrylate (EA), butyl acrylate (BA), or 2-ethylhexyl acrylate (2EHA) are preferably used.

Amount of the alkyl (meth)acrylate among monomers constituting the acrylic copolymer is preferably 55 to 80 wt % because insufficient amounts degrade basic performance and excessive amounts tend to degrade heat tolerance.

Furthermore, amount of the acrylonitrile (AN) among monomers constituting the acrylic copolymer is preferably 15 to 30 wt % because insufficient amounts tend to degrade heat tolerance and excessive amounts tend lead to difficulties in dissolving in solvents.

Furthermore, amount of the glycidyl methacrylate (GMA) among monomers constituting the acrylic copolymer is preferably 5 to 15 wt % because insufficient amounts tend to degrade heat tolerance and excessive amounts tend to degrade peel strength.

The polymerization method of the acrylic copolymer is not particularly limited, but pearl polymerization is preferably used in view of obtaining a high molecular weight. The weight average molecular weight of the acrylic copolymer is preferably 500,000 to 700,000 and more preferably 550,000 to 650,000 because insufficient weight average molecular weights degrade heat tolerance and excessive weight average molecular weights tend to increase viscosity in solvents and degrade application properties.

(B) Epoxy Resin

The epoxy resin forms a three-dimensional network structure and imparts good heat tolerance and adhesive properties, and it is preferable to use a solid epoxy resin and a liquid epoxy resin in combination. Herein, solid epoxy resin means an epoxy resin which is solid at normal temperature. Further, liquid epoxy resin means an epoxy resin which is liquid at normal temperature. It should be noted that normal temperature is as defined by JIS Z 8703 as 5 to 35° C.

The solid epoxy resin is not particularly limited so long as being compatible with the liquid epoxy resin and solid at normal temperature; examples thereof include polyfunctional type epoxy resin, dicyclopentadiene type epoxy resin, novolac phenol type epoxy resin, biphenyl type epoxy resin, and naphthalene type epoxy resin, among others; these may be used individually or in a combination of two or more. Of these, a DCPD type epoxy resin is preferably used.

Furthermore, the solid epoxy resin is preferably contained at 20 to 45 pts. mass and more preferably 25 to 35 pts. mass with respect to 100 pts. mass of the acrylic copolymer because insufficient content degrades heat tolerance and excessive content tends to degrade adhesive properties.

The liquid epoxy resin is not particularly limited so long as being a liquid at normal temperature; examples thereof include bisphenol A type epoxy resin, bisphenol F type epoxy resin, novolac phenol type epoxy resin, and naphthalene type epoxy resin, among others; these may be used individually or in a combination of two or more. In particular, in view of tack properties and flexibility in films, it is preferable to use bisphenol A type epoxy resin or bisphenol F type epoxy resin.

Furthermore, the liquid epoxy resin is preferably contained at 5 to 20 pts. mass and more preferably 5 to 15 pts. mass with respect to 100 pts. mass of the acrylic copolymer because insufficient content degrades resin flow properties and excessive content tends to degrade storage stability at normal temperature.

Thus, the total contained amount of all epoxy resin including the solid epoxy resin and the liquid epoxy resin is preferably 25 to 65 pts. mass and more preferably 30 to 50 pts. mass with respect to 100 pts. mass of the acrylic copolymer.

(C) Epoxy Resin Curing Agent

As the epoxy resin curing agent, commonly known curing agents can be used. Examples include organic acid dihydrazide, dicyandiamide, amine compounds, polyamide amine compounds, cyanate ester compounds, phenol resins, acid anhydride, carboxylic acids, tertiary amine compounds, imidazole, Lewis acids, Bronsted acid salts, polymercaptan type curing agents, urea resin, melamine resin, isocyanate compounds, blocked isocyanate compounds, and latent curing agents, among others; these may be used individually or in a combination of two or more. Among these, an organic acid dihydrazide is preferably used in view of storage stability at normal temperature.

Because the organic acid dihydrazide is solid at normal temperature, it is possible to improve storage stability of the thermosetting adhesive composition at normal temperature. Examples of the organic acid dihydrazide include adipic acid dihydrazide, oxalic acid dihydrazide, malonic acid dihydrazide, succinic dihydrazide, iminodiacetic acid dihydrazide, pimelic acid dihydrazide, suberic acid dihydrazide, azelaic acid dihydrazide, sebacic acid dihydrazide, dodecanediohydrazide, hexadecane dihydrazide, maleic acid dihydrazide, fumaric acid dihydrazide, diglycolic acid dihydrazide, tartaric acid dihydrazide, malic acid dihydrazide, isophthalic acid dihydrazide, terephthalic acid dihydrazide, 2,6-naphthoic acid dihydrazide, 4,4'-bisbenzene dihydrazide, 1,4-naphthoic acid dihydrazide, AJICURE VDH, AJICURE UDH (trade names, manufactured by Ajinomoto Fine-Techno Co., Inc.), and citric acid trihydrazide, among others; these may be used individually or in a combination of two or more. Among these, adipic acid dihydrazide is preferably used in view of possessing a relatively low melting point and an excellent balance of curing properties in addition to being easy to obtain.

Furthermore, the organic acid dihydrazide preferably has an average particle diameter of 0.5 to 15 μm, and more preferably 1 to 5 μm. With insufficient particle diameters, organic acid dihydrazide particles tend to dissolve in the case of using an organic solvent to apply the thermosetting adhesive composition and storage stability at normal temperature is degraded; with excessive particle diameters, application properties of the thermosetting adhesive composition are degraded and large particle sizes lead to difficulties in sufficiently mixing with other components such as the acrylic copolymer and the epoxy resin.

The epoxy resin curing agent is preferably contained at 5 to 20 pts. mass and more preferably 5 to 15 pts. mass with respect to 100 pts. mass of the acrylic copolymer and the epoxy resin because insufficient content leads to degraded heat tolerance and insufficient adhesive properties and excessive content causes unreacted excess curing a agent to remain, leading to degraded heat tolerance and adhesive properties.

(D) Dendritic Conductive Filler

The dendritic conductive filler has a tap density of 1.0 to 1.8 g/cm$^3$ and more preferably 1.1 to 1.6 g/cm$^3$. Insufficient tap densities tend to increase resin flow (protrusion) of the thermosetting adhesive caused by hot pressing, and excessive tap densities lead to filling of the conductive filler being overly dense, which tends to degrade stable conductivity in high-temperature environments or high-temperature/high-humidity environments.

Herein, the dendritic shape, also called a dendrite, means a shape resembling a branch of a tree, having main and side branches. In the dendritic conductive filler, easy entanglement of the main and side branches with each other enables suppression of decreases in electrical contacts caused by respective individuals of the conductive filler separating due to bending or deformation. The tap density of conductive filler is measured by a method specified in JIS Z 2512. In particular, a specified amount of powder is added to a container and tapped using a tapping device until volume of the powder does not further decrease, the mass of the powder is then divided by the post-tapping volume of the powder to obtain the density.

The dendritic conductive filler can be obtained by forming main and side branches in a metal powder by, for example, an electrolysis method or a liquid-phase reduction method. Examples of the metal powder are copper powder, silver powder, and nickel powder, among others, and examples of the main and side branches are those of copper, silver, and gold, among others. That is, examples of the dendritic conductive filler include copper-coated copper powder, silver-coated copper powder, gold-coated copper powder, silver-coated nickel powder, and gold-coated nickel powder, among others; among these, a silver coated copper powder is preferably used.

Average particle diameter of the dendritic conductive filler is preferably 3 to 20 µm and more preferably 5 to 15 µm. Insufficient average particle diameters lead to difficulties in main and side branch formation and excessive average particle diameters lead to difficulties in achieving thin films. Herein, average particle diameter of conductive filler is determined to be a particle diameter $D_{50}$ at which the undersize fraction, calculated from particle size distribution measured by laser diffraction/scattering, is 50%.

The dendritic conductive filler is preferably added at an amount that is 100 to 300 pts. mass, and more preferably 150 to 250 pts. mass with respect to 100 pts. mass of the acrylic copolymer. Insufficient addition amounts tend to degrade conductivity and resin flow properties and excessive addition amounts tend to degrade stable conductivity in high-temperature environments or high-temperature/high-humidity environments.

As a conductive filler, a non-dendritic conductive filler such as that having a spherical, flake, or filament shape, among others, may be added. In the case of having the non-dendritic conductive filler, the dendritic conductive filler preferably constitutes 40 to 100% and more preferably 60 to 100% of total conductive filler. Insufficient percentages of the dendritic conductive filler tend to degrade stable conductivity in high-temperature environments or high-temperature/high-humidity environments.

Other Additives

It is also preferable to blend a nitrile rubber in the thermosetting adhesive composition as another additive. Excellent mechanical performance and elasticity of the nitrile rubber can improve temporary pasting properties. The nitrile rubber is preferably added at an amount that is 1 to 20 pts. mass and more preferably 5 to 15 pts. mass with respect to 100 pts. mass of the acrylic copolymer. Insufficient addition amounts tend to degrade temporary pasting properties and excessive addition amounts tend to increase electrical resistance in high-temperature environments or high-temperature/high-humidity environments.

According to need, inorganic fillers, thermally conductive particles, film forming resins, diluting monomers such as various acrylic monomers, filler agents, softening agents, coloring agents, flame retardant agents, thixotropic agents, and silane coupling agents, among others, may be blended.

According to the thermosetting adhesive composition constituted by such components, along with thermal expansion being suppressed by the acrylic copolymer, because electrical contacts are increased by the dendritic conductive filler, even in high-temperature environments or high-temperature/high-humidity environments, degradation of electrical contacts related to separation of respective individuals of the conductive filler can be suppressed and stable conductivity can be obtained.

2. Thermosetting Adhesive Sheet

A thermosetting adhesive sheet according to the present embodiment comprises an acrylic copolymer (A) obtained by copolymerizing 55 to 80 wt % of alkyl (meth)acrylate, 15 to 30 wt % of acrylonitrile (AN), and 5 to 15 wt % of glycidyl methacrylate (GMA); an epoxy resin (B); an epoxy resin curing agent (C); and a dendritic conductive filler (D) having a tap density of 1.0 to 1.8 g/cm$^3$. The respective components (A) to (D) are the same as those of the thermosetting adhesive composition described above, and a description thereof will be omitted.

The thermosetting adhesive composition described above can be prepared by uniformly mixing by using a conventional method. Then, a thermosetting adhesive sheet having a thermosetting adhesive layer can be manufactured by coating the thermosetting adhesive composition on a base film with a bar coater or roll coater so as to achieve an after-drying thickness of 10 to 60 µm, and drying by using a conventional method.

As the base film, release-treated bases such as polyethylene terephthalate film or polyimide film, among others, which are release-treated according to need, for example, with silicone, can be used.

Such a thermosetting adhesive sheet can be favorably used in, for example, adhesively securing a terminal portion of a flexible printed wiring board with a reinforcing sheet, such as of polyethylene terephthalate, polyimide, glass epoxy, stainless steel, or aluminum, among others, having a thickness of 50 µm to 2 mm. In addition, because close contact with the reinforcing sheet can be easily achieved with heat lamination, handling properties can be improved.

Figure 1:
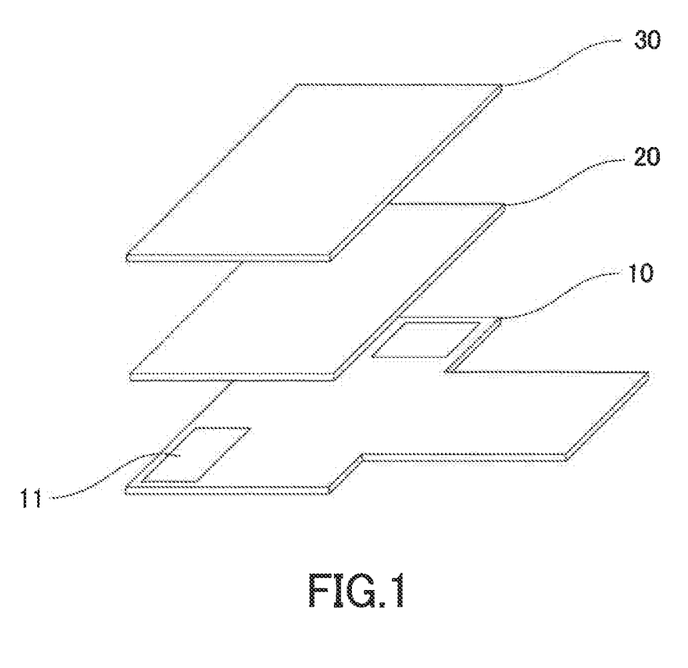
FIG. 1 is a perspective view illustrating a connection method using a thermosetting adhesive sheet.
Figure 2:
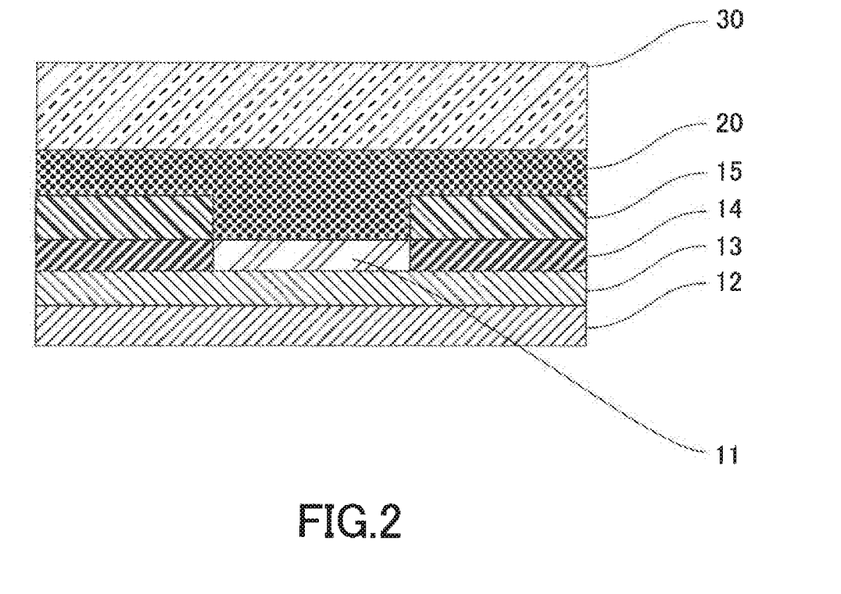
FIG. 2 is a cross-sectional view of a connection structure using a thermosetting adhesive sheet.

FIGS. 1 and 2 illustrate connection examples using the thermosetting adhesive sheet. As illustrated in FIGS. 1 and 2, in a connection structure using the thermosetting adhesive sheet, a flexible printed wiring board 10 and a metal plate 30 are bonded by a thermosetting adhesive sheet 20.

The flexible printed wiring board 10 has a base material 12, wiring 13, an adhesive layer 14, and a protective layer 15 laminated in this order, and has a ground terminal 11 on an edge portion. The flexible printed wiring board 10 comprises, for example, polyimide as the base material 12, copper as the wiring 13, polyimide as the protective layer 15, and gold plated to a surface of the ground terminal 11.

Using the thermosetting adhesive sheet 20 to bond the flexible printed wiring board 10 to the metal plate 30 reinforces the flexible printed wiring board 10 in addition to grounding the ground terminal 11 of the flexible printed wiring board 10 to the metal plate 30 and providing shielding. In particular, with the above-mentioned thermosetting adhesive sheet, along with thermal expansion after curing being suppressed by the acrylic copolymer with a predetermined blend, because electrical contacts of the conductive filler are increased by the dendritic conductive filler which has a predetermined tap density, even in high-temperature environments or high-temperature/high-humidity environments, stable conductivity can be obtained.

EXAMPLES

3. Examples

Hereinafter, examples of the present invention will be described. In the present examples, acrylic copolymers (acrylic polymers) or a polyamide resin, which will be described below, an epoxy resin, a nitrile rubber, an epoxy resin curing agent, and conductive fillers were blended to prepare thermosetting adhesive compositions. Herein, tap density of the conductive filler was measured by a method specified in Z 2512. In particular, a specified amount of powder was added to a container and tapped using a tapping device until volume of the powder did not further decrease, the mass of the powder was then divided by the post-tapping volume of the powder to obtain the density. Herein, average particle diameter of conductive filler was determined to be the particle diameter $D_{50}$ at which the undersize fraction, calculated from a particle size distribution measured by laser diffraction/scattering, was 50%.

Acrylic polymer: acrylic copolymer obtained by copolymerizing alkyl (meth)acrylate containing butyl acrylate (BA) and ethyl acrylate (EA), acrylonitrile (AN), and glycidyl methacrylate (GMA) at predetermined mass ratios.

Polyamide resin: PA, T&K TOKA CO., LTD.

Liquid epoxy resin: jER 828, Mitsubishi Chemical Corporation

Solid epoxy resin: DCPD type solid epoxy resin (RP 7200L, DIC Corporation)

Nitrile rubber: NIPOL 1001, ZEON CORPORATION

Epoxy resin curing agent: adipic acid dihydrazide

Spherical nickel powder: tap density 4.39, average particle diameter 5 μm, SFR-Ni, NIPPON ATOMIZED METAL POWDERS CORPORATION Dendritic copper powder A: tap density 1.18, average particle diameter 10 μm Dendritic copper powder B: tap density 1.60, average particle diameter 12 μm Dendritic copper powder C: tap density 3.28, average particle diameter 23 μm Dendritic copper powder D: tap density 0.89, average particle diameter 6 μm Filamentary nickel powder: tap density 1.25, F-255, Vale Then, thermosetting adhesive sheets having 35-μm-thick thermosetting adhesive layers were manufactured by coating the thermosetting adhesive compositions onto a release-treated polyethylene terephthalate film (PET) and drying in an oven at 50 to 130° C. Subsequently, the following items (1) to (5) were evaluated.

(1) Temporary Pasting Properties Evaluation

The thermosetting adhesive sheets were cut into strips (2 cm×8 cm) and the thermosetting adhesive layers thereof were temporarily pasted by laminating to 150-μm-thick SUS (stainless steel) plates (2 cm×12 cm) with a laminator set at 140° C., 1 m/min, and 0.5 MPa before removing the release-treated bases to expose the thermosetting adhesive layers. Single-sided adhesive tape (2 cm×10 cm) was affixed to the exposed thermosetting adhesive layers and cut at a width of 1 cm before, using the adhesive tape as a backing material, measuring peel strength at an angle of 180° by using a tensile tester (TENSILON). In evaluating temporary pasting properties, peel strengths in the thermosetting adhesive sheet were evaluated as "fail" (hereinafter referred to as F) when less than 1.5 N/cm or "good" (hereinafter referred to as G) when 1.5 N/cm or more.

(2) Resistance Value Measurement Before and After Reflow

Thermosetting adhesive sheets were cut into strips (2 cm×3 cm), and the thermosetting adhesive layers thereof were temporarily pasted by laminating to 100-μm-thick SUS plates (2 cm×3 cm) with a laminator set at 140° C. before removing the release-treated bases to expose the thermosetting adhesive layers. Onto the exposed thermosetting adhesive layers, SUS plates of the same size were placed in superposition from above before hot pressing with a vacuum press (Vacuum Star, manufactured by Mikado Technos Co., Ltd.) at a temperature of 185° C., a pressure of 4.0 MPa, and a vacuum holding time of 10 seconds plus a pressing time of 90 seconds and then holding in an oven at 140° C. for 60 minutes. Thereafter, the test pieces were passed through a reflow furnace set at a top temperature of 260° C. for 30 seconds. Resistances between the SUS plates before and after passing through the reflow furnace were measured using a digital multimeter (Digital Multimeter 7555, manufactured by Yokogawa Meters & Instruments Corporation).

(3) Resistance Value Measurement Before and After Humidity and Heat Test

The test pieces were prepared as in (2) described above and passed through a reflow furnace. After passing through reflow, the test pieces were held for 500 hours in a heat and humidity oven at 85° C. and 85% relative humidity. Resistances between the SUS plates before and after the heat and humidity test were measured using a digital millimeter (Digital Millimeter 7555, manufactured by Yokogawa Meters & Instruments Corporation).

(4) Resin Flow Measurement

One surface of the thermosetting adhesive layers of the thermosetting adhesive sheets was temporarily pasted to 100-μm-thick SUS plates (2 cm×3 cm) with a laminator set at 140° C. before removing the release-treated base material to expose the other surface of the thermosetting adhesive layers and trimming the thermosetting adhesive layers to be the same size as the SUS plates. The exposed thermosetting adhesive layers on the SUS plates were temporarily pasted to 175-μm-thick polyimide films (5 cm×5 cm) with a laminator set at 140° C. and subsequently hot-pressed with a vacuum press (Vacuum Star, manufactured by Mikado Technos Co., Ltd.) at a temperature of 185° C., a pressure of 4.0 MPa, and a vacuum holding time of 10 seconds plus a pressing time of 90 seconds before holding in an oven at 140° C. for 60 minutes. Then, resin flow was measured as the length at which the thermosetting adhesive layer was forced out from end portions of the SUS plate edges of the test pieces using a metallurgical microscope.

(5) Normal Temperature Storage Properties Evaluation

Thermosetting adhesive sheets were stored at normal temperature (25° C.) for three months and then cut into strips (2 cm×3 cm); thereafter, the thermosetting layers thereof were temporarily pasted to 100-μm-thick SUS plates (2 cm×3 cm) with a laminator set at 140° C. before removing the release-treated base material to expose the thermosetting adhesive layers. Onto the exposed thermosetting adhesive layers, 50-μm-thick polyimide films (200H, DuPont) having the same size were placed in superposition from above before hot pressing with a vacuum press (Vacuum Star, manufactured by Mikado Technos Co., Ltd.) at a temperature of 185° C., a pressure of 4.0 MPa, and a vacuum holding time of 10 seconds plus a pressing time of 10 seconds and then holding in an oven at 140° C. for 60 minutes. Then, the polyimide films were subjected to a 90-degree peel test at a peeling rate of 50 mm/min to measure the forces required to peel. In evaluating normal temperature storage properties between initial thermosetting adhesive sheets and thermosetting adhesive sheets after storing at normal temperature (25° C.) for three months, differences of less than 2 N/cm were evaluated as "pass" (hereinafter referred to as P) and differences of 2 N/cm or more were evaluated as "fail" (hereinafter referred to as F).

Example 1

As shown in Table 1, a thermosetting adhesive sheet was prepared using a thermosetting adhesive composition comprising 100 pts. mass of an acrylic copolymer obtained by copolymerizing 66 pts. mass of alkyl (meth)acrylate, 24 pts. mass of acrylonitrile (AN), and 10 pts. mass of glycidyl methacrylate (GMA); 30 pts. mass of solid epoxy resin; 10 pts. mass of liquid epoxy resin; 8 pts. mass of nitrile rubber; 10 pts. mass of adipic acid dihydrazide; and 250 pts. mass of dendritic copper powder A (tap density 1.18 g/cm$^3$). The percentage of dendritic filler in the conductive filler of the thermosetting adhesive sheet was 100%.

Temporary pasting properties (1) of the thermosetting adhesive sheet of Example 1 were evaluated as P. (2) Resistance values were 4.50E-02Ω before reflow and 4.70E-02Ω after reflow, percentage change being 4.4%. (3) Resistance values were 4.70E-02Ω before the humidity and heat test and 5.00E-02Ω after, percentage change being 6.4%. (4) Resin flow was 115 μm. (5) Normal temperature storage properties evaluation resulted in P.

Example 2

As shown in Table 1, a thermosetting adhesive sheet was prepared using a thermosetting adhesive composition comprising 100 pts. mass of an acrylic copolymer obtained by copolymerizing 66 pts. mass of alkyl (meth)acrylate, 24 pts. mass of acrylonitrile (AN), and 10 pts. mass of glycidyl methacrylate (GMA); 30 pts. mass of solid epoxy resin; 10 pts. mass of liquid epoxy resin; 8 pts. mass of nitrile rubber; 10 pts. mass of adipic acid dihydrazide; 150 pts. mass of dendritic copper powder A (tap density 1.18 g/cm$^3$); and 100 pts. mass of filamentary nickel powder (tap density 1.25 g/cm$^3$). The percentage of dendritic filler in the conductive filler of the thermosetting adhesive sheet was 60%.

(2) Resistance values of the thermosetting adhesive sheet of Example 2 were 6.30E-02Ω before reflow and 7.00E-02Ω after reflow, percentage change being 11.1%. (3) Resistance values were 7.00E-02Ω before the humidity and heat test and 8.20E-02Ω after, percentage change being 17.0%. (4) Resin flow was 124 μm. (5) Normal temperature storage properties evaluation resulted in P.

Example 3

As shown in Table 1, a thermosetting adhesive sheet was prepared using a thermosetting adhesive composition comprising 100 pts. mass of an acrylic copolymer obtained by copolymerizing 66 pts. mass of alkyl (meth)acrylate, 24 pts. mass of acrylonitrile (AN), and 10 pts. mass of glycidyl methacrylate (GMA); 30 pts. mass of solid epoxy resin; 10 pts. mass of liquid epoxy resin; 8 pts. mass of nitrile rubber; 10 pts. mass of adipic acid dihydrazide; and 250 pts. mass of dendritic copper powder B (tap density 1.60 g/cm$^3$). The percentage of dendritic filler in the conductive filler of the thermosetting adhesive sheet was 100%.

(2) Resistance values of the thermosetting adhesive sheet of Example 3 were 4.90E-02Ω before reflow and 5.40E-02Ω after reflow, percentage change being 10.2%. (3) Resistance values were 5.40E-02Ω before the humidity and heat test and 6.20E-02Ω after, percentage change being 14.8%. (4) Resin flow was 112 μm. (5) Normal temperature storage properties evaluation resulted in P.

Comparative Example 1

As shown in Table 1, a thermosetting adhesive sheet was prepared using a thermosetting adhesive composition comprising 100 pts. mass of an acrylic copolymer obtained by copolymerizing 81 pts. mass of alkyl (meth)acrylate, 13 pts. mass of acrylonitrile (AN), and 6 pts. mass of glycidyl methacrylate (GMA); 30 pts. mass of solid epoxy resin; 10 pts. mass of liquid epoxy resin; 8 pts. mass of nitrile rubber; 10 pts. mass of adipic acid dihydrazide; and 250 pts. mass of dendritic copper powder A (tap density 1.18 g/cm$^3$). The percentage of dendritic filler in the conductive filler of the thermosetting adhesive sheet was 100%.

(2) Resistance values of the thermosetting adhesive sheet of Comparative Example 1 were 7.20E-02Ω before reflow and 1.30E-01Ω after reflow, percentage change being 80.6%. (3) Resistance values were 1.30E-01Ω before the humidity and heat test and 1.45E-01Ω after, percentage change being 11.5%. (4) Resin flow was 110 μm. (5) Normal temperature storage properties evaluation resulted in P.

Comparative Example 2

As shown in Table 1, a thermosetting adhesive sheet was prepared using a thermosetting adhesive composition comprising 100 pts. mass of an acrylic copolymer obtained by copolymerizing 75 pts. mass of alkyl (meth)acrylate, 24 pts. mass of acrylonitrile (AN), and 1 pts. mass of glycidyl methacrylate (GMA); 30 pts. mass of solid epoxy resin; 10 pts. mass of liquid epoxy resin; 8 pts. mass of nitrile rubber; 10 pts. mass of adipic acid dihydrazide; and 250 pts. mass of dendritic copper powder A (tap density 1.18 g/cm$^3$). The percentage of dendritic filler in the conductive filler of the thermosetting adhesive sheet was 100%.

(2) Resistance values of the thermosetting adhesive sheet of Comparative Example 2 were 6.80E-02Ω before reflow and 2.10E-01Ω after reflow, percentage change being 208.8%. (3) Resistance values were 2.10E-01Ω before the humidity and heat test and 2.32E-01Ω after, percentage change being 10.5%. (4) Resin flow was 116 μm. (5) Normal temperature storage properties evaluation resulted in P.

Comparative Example 3

As shown in Table 1, a thermosetting adhesive sheet was prepared using a thermosetting adhesive composition comprising 100 pts. mass of an acrylic copolymer obtained by copolymerizing 66 pts. mass of alkyl (meth)acrylate, 24 pts. mass of acrylonitrile (AN), and 10 pts. mass of glycidyl methacrylate (GMA); 30 pts. mass of solid epoxy resin; 10 pts. mass of liquid epoxy resin; 8 pts. mass of nitrile rubber; 10 pts. mass of adipic acid dihydrazide; and 300 pts. mass of spherical nickel powder (tap density 4.39 g/cm$^3$). The percentage of dendritic filler in the conductive filler of the thermosetting adhesive sheet was 0%.

(2) Resistance values of the thermosetting adhesive sheet of Comparative Example 3 were 6.20E-02Ω before reflow and 5.43E-01Ω after reflow, percentage change being 775.8%. (3) Resistance values were 5.43E-01Ω before the humidity and heat test and 6.49E-01Ω after, percentage change being 20.0%. (4) Resin flow was 101 μm. (5) Normal temperature storage properties evaluation resulted in P.

Comparative Example 4

As shown in Table 1, a thermosetting adhesive sheet was prepared using a thermosetting adhesive composition comprising 100 pts. mass of acrylic copolymer obtained by copolymerizing 66 pts. mass of alkyl (meth)acrylate, 24 pts. mass of acrylonitrile (AN), and 10 pts. mass of glycidyl methacrylate (GMA); 30 pts. mass of solid epoxy resin; 10 pts. mass of liquid epoxy resin; 8 pts. mass of nitrile rubber; 10 pts. mass of adipic acid dihydrazide; 200 pts. mass of spherical nickel powder (tap density 4.39 g/cm$^3$) and 100 pts. mass of dendritic copper powder A (tap density 1.18 g/cm$^3$). The percentage of dendritic filler in the conductive filler of the thermosetting adhesive sheet was 33%.

(2) Resistance values of the thermosetting adhesive sheet of Comparative Example 4 were 5.30E-02Ω before reflow and 1.13E-01Ω after reflow, percentage change being 113.2%. (3) Resistance values were 1.13E-01Ω before the humidity and heat test and 1.34E-01Ω after, percentage change being 18.6%. (4) Resin flow was 121 μm. (5) Normal temperature storage properties evaluation resulted in P.

Comparative Example 5

As shown in Table 1, a thermosetting adhesive sheet was prepared using a thermosetting adhesive composition comprising 100 pts. mass of polyamide resin, 20 pts. mass of solid epoxy resin, and 200 pts. mass of dendritic copper powder A (tap density 1.18 g/cm$^3$). The percentage of dendritic filler in the conductive filler of the thermosetting adhesive sheet was 100%.

(2) Resistance values of the thermosetting adhesive sheet of Comparative Example 5 were 5.20E-02Ω before reflow and 5.50E-02Ω after reflow, percentage change being 5.8%. (3) Resistance values were 5.90E-02Ω before the humidity and heat test and 6.06E-01Ω after, percentage change being 927.0%. (4) Resin flow was 176 μm. (5) Normal temperature storage properties evaluation resulted in F.

Comparative Example 6

As shown in Table 1, a thermosetting adhesive sheet was prepared using a thermosetting adhesive composition comprising 100 pts. mass of an acrylic copolymer obtained by copolymerizing 66 pts. mass of alkyl (meth)acrylate, 24 pts. mass of acrylonitrile (AN), and 10 pts. mass of glycidyl methacrylate (GMA); 30 pts. mass of solid epoxy resin; 10 pts. mass of liquid epoxy resin; 8 pts. mass of nitrile rubber; 10 pts. mass of adipic acid dihydrazide; and 250 pts. mass of dendritic copper powder C (tap density 3.28 g/cm$^3$). The percentage of dendritic filler in the conductive filler of the thermosetting adhesive sheet was 100%.

(2) Resistance values of the thermosetting adhesive sheet of Comparative Example 6 were 5.60E-02Ω before reflow and 1.23E-01Ω after reflow, percentage change being 120.0%. (3) Resistance values were 1.23E-01Ω before the humidity and heat test and 1.76E-01Ω after, percentage change being 43.1%. (4) Resin flow was 94 μm. (5) Normal temperature storage properties evaluation resulted in P.

Comparative Example 7

As shown in Table 1, a thermosetting adhesive sheet was prepared using a thermosetting adhesive composition comprising 100 pts. mass of an acrylic copolymer obtained by copolymerizing 66 pts. mass of alkyl (meth)acrylate, 24 pts. mass of acrylonitrile (AN), and 10 pts. mass of glycidyl methacrylate (GMA); 30 pts. mass of solid epoxy resin; 10 pts. mass of liquid epoxy resin; 8 pts. mass of nitrile rubber; 10 pts. mass of adipic acid dihydrazide; and 250 pts. mass of dendritic copper powder D (tap density 0.89 g/cm$^3$). The percentage of dendritic filler in the conductive filler of the thermosetting adhesive sheet was 100%.

(2) Resistance values of the thermosetting adhesive sheet of Comparative Example 7 were 4.60E-02Ω before reflow and 5.20E-02Ω after reflow, percentage change being 13.0%. (3) Resistance values were 5.20E-02Ω before the humidity and heat test and 6.10E-02Ω after, percentage change being 17.3%. (4) Rosin flow was 194 μm. (5) Normal temperature storage properties evaluation resulted in P.

Comparative Example 8

As shown in Table 1, a thermosetting adhesive sheet was prepared using a thermosetting adhesive composition comprising 100 pts. mass of an acrylic copolymer obtained by copolymerizing 66 pts. mass of alkyl (meth)acrylate, 24 pts. mass of acrylonitrile (AN), and 10 pts. mass of glycidyl methacrylate (GMA); 30 pts. mass of solid epoxy resin; 10 pts. mass of liquid epoxy resin; 10 pts. mass of adipic acid dihydrazide; and 250 pts. mass of dendritic copper powder A (tap density 1.18 g/cm$^3$). The percentage of dendritic filler in the conductive filler of the thermosetting adhesive sheet was 100%.

Temporary pasting properties (1) of the thermosetting adhesive sheet of Comparative Example 8 were evaluated as F. (2) Resistance values were 3.80E-02Ω before reflow and 4.10E-02Ω after reflow, percentage change being 7.9%. (3) Resistance values were 4.10E-02Ω before the humidity and heat test and 4.60E-02Ω after, percentage change being 12.2%. (4) Resin flow was 103 μm. (5) Normal temperature storage properties evaluation resulted in P.

TABLE 1

| | | Ex. 1 | Ex. 2 | Ex. 3 | Comp. 1 | Comp. 2 | Comp. 3 |
|---|---|---|---|---|---|---|---|
| Acrylic copolymer | BA, EA, etc. | 66 | 66 | 66 | 81 | 75 | 66 |
| | AN | 24 | 24 | 24 | 13 | 24 | 24 |
| | GMA | 10 | 10 | 10 | 6 | 1 | 10 |
| Polyamide resin | | — | — | — | — | — | — |
| Epoxy resin | Solid epoxy resin | 30 | 30 | 30 | 30 | 30 | 30 |
| | Liquid epoxy resin | 10 | 10 | 10 | 10 | 10 | 10 |
| NBR | NIPOL 1001 | 8 | 8 | 8 | 8 | 8 | 8 |
| Curing agent | Adipic acid dihydrazide | 10 | 10 | 10 | 10 | 10 | 10 |
| Spherical nickel powder (tap density 4.39) | | — | — | — | — | — | 300 |
| Dendritic copper powder A (tap density 1.18) | | 250 | 150 | — | 250 | 250 | — |
| Dendritic copper powder B (tap density 1.60) | | — | — | 250 | — | — | — |
| Dendritic copper powder C (tap density 3.28) | | — | — | — | — | — | — |
| Dendritic copper powder D (tap density 0.89) | | — | — | — | — | — | — |
| Filamentary nickel powder (tap density 1.25) | | — | 100 | — | — | — | — |
| Percent dendritic filler in conductive filler (%) | | 100 | 60 | 100 | 100 | 100 | 0 |
| Temporary pasting properties evaluation | | G | — | — | — | — | — |
| High-temperature test | Pre-reflow resistance (Ω) | 4.50E-02 | 6.30E-02 | 4.90E-02 | 7.20E-02 | 6.80E-02 | 6.20E-02 |
| | Post-reflow resistance (Ω) | 4.70E-02 | 7.00E-02 | 5.40E-02 | 1.30E-01 | 2.10E-01 | 5.43E-01 |
| | Change (%) | 4.4 | 11.1 | 10.2 | 80.6 | 208.8 | 775.8 |
| High-heat/ humidity test | Pre-heat/humidity test resistance (Ω) | 4.70E-02 | 7.00E-02 | 5.40E-02 | 1.30E-01 | 2.10E-01 | 5.43E-01 |
| | Post-heat/ humidity test resistance (Ω) | 5.00E-02 | 8.20E-02 | 6.20E-02 | 1.45E-01 | 2.32E-01 | 6.49E-01 |

TABLE 1-continued

|  |  | Comp. 4 | Comp. 5 | Comp. 6 | Comp. 7 | Comp. 8 |
|---|---|---|---|---|---|---|
|  | Change (%) | 6.4 | 17 | 14.8 | 11.5 | 10.5 | 20 |
|  | Resin flow (μm) | 115 | 124 | 112 | 110 | 116 | 101 |
|  | Normal temp. storage properties evaluation | P | P | P | P | P | P |

| | | Comp. 4 | Comp. 5 | Comp. 6 | Comp. 7 | Comp. 8 |
|---|---|---|---|---|---|---|
| Acrylic copolymer | BA, EA, etc. | 66 | — | 66 | 66 | 66 |
| | AN | 24 | — | 24 | 24 | 24 |
| | GMA | 10 | — | 10 | 10 | 10 |
| Polyamide resin | | — | 100 | — | — | — |
| Epoxy resin | Solid epoxy resin | 30 | 20 | 30 | 30 | 30 |
| | Liquid epoxy resin | 10 | — | 10 | 10 | 10 |
| NBR | NIPOL 1001 | 8 | — | 8 | 8 | — |
| Curing agent | Adipic acid dihydrazide | 10 | — | 10 | 10 | 10 |
| | Spherical nickel powder (tap density 4.39) | 200 | — | — | — | — |
| | Dendritic copper powder A (tap density 1.18) | 100 | 200 | — | — | 250 |
| | Dendritic copper powder B (tap density 1.60) | — | — | — | — | — |
| | Dendritic copper powder C (tap density 3.28) | — | — | 250 | — | — |
| | Dendritic copper powder D (tap density 0.89) | — | — | — | 250 | — |
| | Filamentary nickel powder (tap density 1.25) | — | — | — | — | — |
| | Percent dendritic filler in conductive filler (%) | 33 | 100 | 100 | 100 | 100 |
| | Temporary pasting properties evaluation | — | — | — | — | F |
| High-temperature test | Pre-reflow resistance (Ω) | 5.30E−02 | 5.20E−02 | 5.60E−02 | 4.60E−02 | 3.80E−02 |
| | Post-reflow resistance (Ω) | 1.13E−01 | 5.50E−02 | 1.23E−01 | 5.20E−02 | 4.10E−02 |
| | Change (%) | 113.2 | 5.8 | 120 | 13 | 7.9 |
| High-heat/ humidity test | Pre-heat/humidity test resistance (Ω) | 1.13E−01 | 5.90E−02 | 1.23E−01 | 5.20E−02 | 4.10E−02 |
| | Post-heat/ humidity test resistance (Ω) | 1.34E−01 | 6.06E−01 | 1.76E−01 | 6.10E−02 | 4.60E−02 |
| | Change (%) | 18.6 | 927 | 43.1 | 17.3 | 12.2 |
| | Resin flow (μm) | 121 | 176 | 94 | 194 | 103 |
| | Normal temp. storage properties evaluation | P | F | P | P | P |

As in Comparative Examples 1 and 2, in the case of not using an acrylic copolymer obtained by copolymerizing 55 to 80 wt % of alkyl (meth)acrylate, 15 to 30 wt % acrylonitrile, and 5 to 15 wt % of glycidyl methacrylate, resistance increased in the reflow test and stability was degraded. Moreover, as in Comparative Example 3, in the case of adding a spherical conductive filler, as in Comparative Examples 1 and 2, resistance increased in the reflow test and stability was degraded. Furthermore, as in Comparative Example 4, in the case of adding the dendritic conductive filler in the conductive filler at a percentage of 33%, although stability was improved in comparison with Comparative Example 3, resistance was high. Moreover, in the case of using polyamide resin instead of acrylic copolymer as in Comparative Example 5, although heat tolerance in the reflow test was favorable, resistance increased in the high-humidity/high-temperature test and stability was degraded; normal temperature storage properties were also degraded. Moreover, in the case of using a dendritic conductive filler having a tap density of 3.28 g/cm³ as in Comparative Example 6, although resin flow was small, resistance increased in the reflow test and the high-humidity/high-temperature test and stability was degraded. Furthermore, in the case of using dendritic conductive filler having a tap density of 0.89 g/cm³ as in Comparative Example 7, although stable conductivity was exhibited in the reflow test and the high-humidity/high-temperature test, resin flow was large. Moreover, in the case of not adding nitrile rubber as in Comparative Example 8, temporary pasting properties were degraded.

On the other hand, as in Examples 1 to 3, by using an acrylic copolymer obtained by copolymerizing 55 to 80 wt % of alkyl (meth)acrylate, 15 to 30 wt % of acrylonitrile and 5 to 15 wt % of glycidyl methacrylate and a dendritic conductive filler having a tap density of 1.0 to 1.8 g/cm³, stable conductivity in the reflow test and high-humidity/high-temperature test, small resin flow, and excellent normal temperature storage properties were exhibited. Furthermore, by adding nitrile rubber, excellent temporary pasting properties were achieved.

REFERENCE SIGNS LIST 10 flexible printed wiring board, 11 ground terminal, 12 base material, 13 wiring, 14 adhesive layer, 15 protective layer, 20 thermosetting adhesive sheet, 30 metal plate

The invention claimed is:

1. A thermosetting adhesive composition comprising:
    an acrylic copolymer obtained by copolymerizing 55 to 80 wt % of alkyl (meth)acrylate, 15 to 30 wt % of acrylonitrile, and 5 to 15 wt % of glycidyl methacrylate;
    an epoxy resin;
    an epoxy resin curing agent; and
    a dendritic conductive filler having a tap density of 1.0 to 1.8 g/cm³; wherein
    the epoxy resin contains a liquid epoxy resin and a solid epoxy resin,
    the solid epoxy resin is contained at 20 to 45 pts. mass with respect to 100 pts. mass of the acrylic copolymer,
    the liquid epoxy resin is contained at 5 to 20 pts. mass with respect to 100 pts. mass of the acrylic copolymer, and
    the epoxy resin curing agent is contained at 5 to 20 pts. mass with respect to 100 pts. mass of the total amount of the acrylic copolymer and the epoxy resin.

2. The thermosetting adhesive composition according to claim 1, further comprising a nitrile rubber.

3. The thermosetting adhesive composition according to claim 1, wherein the epoxy resin curing agent is an organic acid dihydrazide.

4. The thermosetting adhesive composition according to claim 1, wherein the dendritic conductive filler is added at an amount that is 100 to 300 pts. mass with respect to 100 pts. mass of the acrylic copolymer.

5. The thermosetting adhesive composition according to claim 4, wherein the dendritic conductive filler constitutes 40 to 100% of total conductive filler.

6. The thermosetting adhesive composition according to claim 1, wherein the epoxy resin is contained at 30 to 50 pts. mass with respect to 100 pts. mass of the acrylic copolymer.

7. A thermosetting adhesive sheet comprising:
an acrylic copolymer obtained by copolymerizing 55 to 80 wt % of alkyl (meth)acrylate, 15 to 30 wt % of acrylonitrile, and 5 to 15 wt % of glycidyl methacrylate;
an epoxy resin;
an epoxy resin curing agent; and
a dendritic conductive filler having a tap density of 1.0 to 1.8 g/cm$^3$; wherein
the epoxy resin contains a liquid epoxy resin and a solid epoxy resin,
the solid epoxy resin is contained at 20 to 45 pts. mass with respect to 100 pts. mass of the acrylic copolymer,
the liquid epoxy resin is contained at 5 to 20 pts. mass with respect to 100 pts. mass of the acrylic copolymer, and
the epoxy resin curing agent is contained at 5 to 20 pts. mass with respect to 100 pts. mass of the total amount of the acrylic copolymer and the epoxy resin.

8. The thermosetting adhesive composition according to claim 2, wherein the epoxy resin curing agent is an organic acid dihydrazide.

9. The thermosetting adhesive composition according to claim 2, wherein the dendritic conductive filler is added at an amount that is 100 to 300 pts. mass with respect to 100 pts. mass of the acrylic copolymer.

10. The thermosetting adhesive composition according to claim 3, wherein the dendritic conductive filler is added at an amount that is 100 to 300 pts. mass with respect to 100 pts. mass of the acrylic copolymer.

11. The thermosetting adhesive composition according to claim 2, wherein the epoxy resin is contained at 30 to 50 pts. mass with respect to 100 pts. mass of the acrylic copolymer.

12. The thermosetting adhesive composition according to claim 3, wherein the epoxy resin is contained at 30 to 50 pts. mass with respect to 100 pts. mass of the acrylic copolymer.

13. The thermosetting adhesive composition according to claim 4, wherein the epoxy resin is contained at 30 to 50 pts. mass with respect to 100 pts. mass of the acrylic copolymer.

14. The thermosetting adhesive composition according to claim 5, wherein the epoxy resin is contained at 30 to 50 pts. mass with respect to 100 pts. mass of the acrylic copolymer.

15. The thermosetting adhesive composition according to claim 4, further comprising a non-dendritic conductive filler.

* * * * *